(12) United States Patent
Meyer-Teruel et al.

(10) Patent No.: US 11,265,811 B2
(45) Date of Patent: Mar. 1, 2022

(54) METHOD OF MONITORING AND CONTROLLING AN ONBOARD SYSTEM AND A MONITOR AND CONTROL SYSTEM

(71) Applicant: GM GLOBAL TECHNOLOGY OPERATIONS LLC, Detroit, MI (US)

(72) Inventors: Fiona E. Meyer-Teruel, Detroit, MI (US); Thomas J. Timpf, Jr., Royal Oak, MI (US); Tao Wang, Oakland Township, MI (US); Michael P. Barker, Troy, MI (US); Charles A. Campbell, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 198 days.

(21) Appl. No.: 16/664,119

(22) Filed: Oct. 25, 2019

(65) Prior Publication Data
US 2021/0127332 A1   Apr. 29, 2021

(51) Int. Cl.
*H04W 52/02* (2009.01)
*H04Q 9/00* (2006.01)
*H04L 67/12* (2022.01)

(52) U.S. Cl.
CPC ......... *H04W 52/0219* (2013.01); *H04L 67/12* (2013.01); *H04Q 9/00* (2013.01); *H04Q 2209/883* (2013.01)

(58) Field of Classification Search
CPC .............. H04W 52/0219; H04Q 9/00; H04Q 2209/883; H04Q 2209/823; H04Q 2209/40; H04L 67/12; Y02D 30/70; B60W 50/0098; B60W 2050/0043; B60W 2050/0075; B60R 16/0232
USPC ........................................................ 370/311
See application file for complete search history.

(56) References Cited

U.S. PATENT DOCUMENTS

| | | | |
|---|---|---|---|
| 2012/0053853 A1* | 3/2012 | Tan .................... | B60W 40/109 |
| | | | 702/35 |
| 2017/0301961 A1* | 10/2017 | Kim ........................ | H04B 1/48 |
| 2018/0062403 A1* | 3/2018 | Jeon ...................... | H02J 7/0021 |
| 2018/0295011 A1* | 10/2018 | Wang ..................... | H04L 12/12 |
| 2019/0389316 A1 | 12/2019 | Wang et al. | |
| 2020/0014219 A1 | 1/2020 | Thomson et al. | |
| 2020/0052508 A1 | 2/2020 | Thayer et al. | |
| 2020/0076014 A1 | 3/2020 | Garelli et al. | |

* cited by examiner

*Primary Examiner* — Kwang B Yao
*Assistant Examiner* — Syed M Bokhari
(74) *Attorney, Agent, or Firm* — Quinn IP Law (57) ABSTRACT

A monitor and control system and a method of monitoring and controlling an onboard system of an assembly includes one or more of a plurality of sensors detects whether an event occurred in the onboard system. The sensors communicate with a master controller when the master controller is in a nominal mode in which the master controller is powered on to actively monitor the sensors, and includes a sleep mode in which the master controller is powered off and does not monitor the sensors when in the sleep mode. An agent controller monitors the sensors when the master controller is in the sleep mode. One or more of the sensors signal the agent controller that the event has occurred. The agent controller signals the master controller to awaken from the sleep mode in response to the one or more of the sensors signaling the agent controller of the event.

20 Claims, 3 Drawing Sheets

METHOD OF MONITORING AND CONTROLLING AN ONBOARD SYSTEM AND A MONITOR AND CONTROL SYSTEM

INTRODUCTION

Electrochemical battery packs are used to energize electric machines in a wide variety of host systems. For instance, motor torque from an electric machine may be transmitted to a transmission input member within a powertrain. The electric machine draws energy from and delivers electrical energy to individual battery cells of the battery pack as needed. The battery pack may be recharged by a charging current supplied from an offboard power supply, and in some embodiments via onboard energy regeneration. When the battery pack is actively charging or discharging, corresponding battery cell voltages and temperatures of the battery cells are closely monitored and regulated in real-time by a master battery controller.

Battery packs, particularly those used as a power supply in a hybrid electric or battery electric vehicle, may have a modular design. That is, a desired number of battery cells are arranged into a battery module, with multiple battery modules interconnected to form a battery pack or rechargeable energy storage system having an application-specific voltage capacity. The battery cells of a given battery module are interconnected via a conductive interconnect member or bus bar cap and enclosed in a protective housing to isolate the battery cells from moisture, dirt, and other debris. A host computer may monitor the battery packs even when the vehicle is off and not being charged, which requires a continuous power supply.

SUMMARY

The present disclosure provides a method of monitoring and controlling an onboard system of an assembly. One or more of a plurality of sensors detects whether an event occurred in the onboard system. The sensors communicate with a master controller when the master controller is in a nominal mode in which the master controller is powered on to actively monitor the sensors. The master controller also includes a sleep mode in which the master controller is powered off and does not monitor the sensors when in the sleep mode. An agent controller monitors the sensors when the master controller is in the sleep mode. One or more of the sensors signal the agent controller when the master controller is in the sleep mode that the event has occurred in the onboard system. The agent controller signals the master controller to awaken from the sleep mode in response to the one or more of the sensors signaling the agent controller of the event. The master controller switches to the nominal mode when woken-up from the sleep mode. The event is communicated to the master controller and the master controller determines an operation to perform to the assembly in response to the event.

The method optionally includes one or more of the following:

A) another one of the sensors is signaled to confirm that the event occurred in the onboard system;

B) the one or more of the sensors that originally detected the event is defined as a first sensor, and the sensor that is signaled to confirm the event is defined as a second sensor;

C) data compiled from the first sensor and data compiled from the second sensor is compared;

D) the one or more of the sensors that signals the agent controller when the master controller is in the sleep mode further includes the agent controller is signaled that the event has occurred when the compared data from the first and second sensors are the same;

E) the one or more of the sensors that signals the agent controller when the master controller is in the sleep mode further includes the agent controller is signaled that the compared data from the first and second sensors are different;

F) the agent controller compiles data from one or more of the sensors other than the first and second sensors when the compared data from the first and second sensors are different;

G) the agent controller that signals the master controller to awaken from the sleep mode further includes the agent controller signals the master controller to awaken from the sleep mode when the agent controller compiled data from the one or more of the sensors other than the first and second sensors to confirm that the event occurred;

H) the onboard system is continuously monitored via the sensors while the master controller is in the sleep mode;

I) the onboard system being continuously monitored further includes the sensors continuously arbitrate between each other to monitor the onboard system;

J) the assembly is further defined as a vehicle;

K) the onboard system is further defined as a battery module that includes a plurality of battery cells that are rechargeable;

L) the battery module is configured to provide power to the vehicle when the vehicle is powered on;

M) the master controller is in the sleep mode when the vehicle is powered off and the battery module is not charging;

N) the sensors and the agent controller operate on a voltage of greater than zero volts and less than six volts via the battery module while the master controller is in the sleep mode;

O) one or more of the sensors that detect whether the event has occurred in the onboard system further includes the one or more of the sensors detects whether the event occurred in one of the battery cells of the battery module;

P) the agent controller that signals the master controller to awaken from the sleep mode further includes a voltage wake-up arbitration or a transceiver wake-up arbitration that is used to switch the master controller back to the nominal mode;

Q) the agent controller analyzes the data received regarding the event; and

R) the agent controller determines whether to awaken the master controller.

The present disclosure also provides a monitor and control system for an onboard system of an assembly. The monitor and control system includes a plurality of sensors in communication with the onboard system. The sensors are configured to detect whether an event occurred in the onboard system. The monitor and control system also includes a master controller that includes a processor and a memory. The master controller includes a nominal mode in which the master controller is powered on and configured to actively monitor the sensors and control the onboard system. The master controller also includes a sleep mode in which the master controller is powered off and the master controller does not monitor the sensors and does not control the onboard system when in the sleep mode. The monitor and control system further includes an agent controller that includes a processor and a memory. The agent controller is in communication with the sensors and the master controller. The agent controller is configured to monitor the sensors when the master controller is in the sleep mode. The agent controller is also configured to awaken the master controller from the sleep mode in response to one or more of the sensors signaling the agent controller of the event. The master controller returns to the nominal mode in response to being woken-up, and is configured to determine an operation to perform to the assembly in response to the event.

The monitor and control system optionally includes one or more of the following:

A) the master controller includes a transceiver, and the agent controller is in communication with the transceiver to awaken the master controller from the sleep mode to the nominal mode;

B) the transceiver of the master controller and the agent controller are in wireless communication with each other;

C) the sensors are in wireless communication with each other such that the sensors continuously arbitrate between each other to monitor the onboard system while the master controller is in the sleep mode;

D) the assembly is further defined as a vehicle;

E) the onboard system is further defined as a battery module that includes a plurality of battery cells that are rechargeable;

F) the battery module is configured to provide power to the vehicle when the vehicle is powered on; and G) the master controller is in the sleep mode when the vehicle is powered off and the battery module is not being charged.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims.

Furthermore, the teachings may be described herein in terms of functional and/or logical block components and/or various processing steps. It should be realized that such block components may be comprised of any number of hardware, software, and/or firmware components configured to perform the specified functions.

Figures 1, 2:
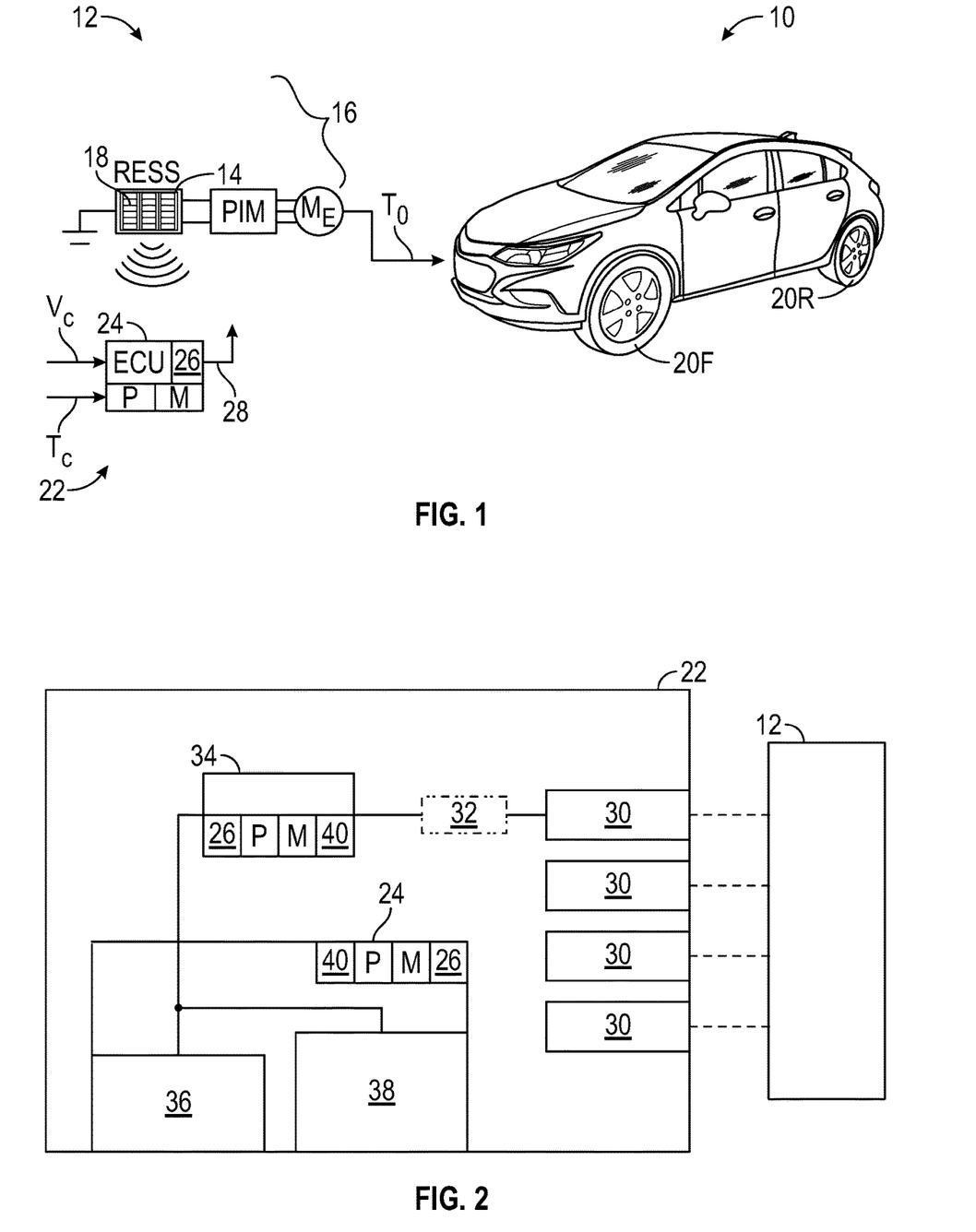
FIG. 1 is a schematic illustration of a monitor and control system for an onboard system of an assembly, which the assembly is illustrated as a vehicle.
FIG. 2 is a schematic diagram of sensors, a master controller and an agent controller.

Referring to the FIGS., wherein like numerals indicate like or corresponding parts throughout the several views, an assembly 10, which in certain configurations may be defined as a vehicle as generally shown in FIG. 1.

Non-limiting examples of the vehicle may include a car, a truck, a motorcycle, an off-road vehicle, a farm vehicle, a watercraft, an aircraft, or any other suitable movable platform. Additionally, the vehicle may be a diesel/gas-powered vehicle, a hybrid vehicle, an electric vehicle, etc. It is to be appreciated that alternatively, the assembly 10 may be a non-vehicle application, such as, farm equipment, stationary platforms, stationary power plants, robots, etc.

Generally, the assembly 10 includes an onboard system 12, which operates various components of the assembly 10. In a vehicle application, for example, the onboard system 12 may include one or more of battery module(s) 14, engine(s), transmission(s), powertrain(s) 16, various electrical components or systems, pump(s), cooling system(s), etc. The vehicle may be powered on in order to operate the vehicle and/or operate various onboard systems 12 of the vehicle. For example, the battery module 14 may be configured to provide power to the vehicle when the vehicle is powered on. The vehicle may also be powered off, in which the vehicle is not operable to drive. When the vehicle is off, the battery module 14 may provide power to monitor and/or control various onboard systems 12, which is discussed further below.

Further with respect to the construction of the battery modules 14, each of the battery modules 14 includes a plurality of individual battery cells 18, and embodies a relatively high-voltage energy storage device having an application-specific number of such battery cells 18. In some applications, as few as two battery modules 14 may be used in the rechargeable energy storage system (RESS), with the actual number being dependent on the required amount of power. For instance, 192 or more individual lithium ion battery cells 18 may be used in an example embodiment collectively capable of outputting at least 18-60 kWh of power depending on the configuration, with a total voltage capacity of 60-300 volts or more. While a vehicle is shown in FIG. 1 as an example embodiment of the assembly 10, again, non-vehicle applications may also be envisioned.

For example, the vehicle may include a powertrain 16, for instance an electric powertrain 16 as shown or a hybrid electric powertrain 16. The powertrain 16 may include one or more electric machines ($M_E$) and an optional internal combustion engine, with the electric machine drawing electrical power from or delivering electrical power to the RESS as needed. The electric machine, powered via a power inverter module (PIM) that is electrically connected to the RESS, may also generate torque (arrow $T_O$) and transmit the same to front and/or rear drive wheels 20F, 20R, respectively.

A monitor and control system 22 may be implemented to provide continuously available monitoring, sensing and/or diagnostic abilities to one or more onboard systems 12 while operating on low power. The monitor and control system 22 for the onboard system 12 may be used to notify a host, such as a master controller 24, of what operation to perform on the assembly 10 during certain situations. Therefore, also described herein is a method of monitoring and controlling the onboard system 12 of the assembly 10. The monitor and control system 22 and the method provide a way to reduce energy usage by powering off the master controller 24 during certain situations, as discussed further below. In addition, the monitor and control system 22 and the method provide a way to reduce hardware stress by powering off the master controller 24.

Each of the battery modules 14 individually determines a respective cell voltage (arrow $V_C$) and cell temperature (arrow $T_C$) for each battery cell 18 housed within the respective battery modules 14, and also transmits the measured data (arrows $V_C$ and $T_C$) to the master controller 24 when in the nominal mode over a secure radio frequency (RF) network, e.g., a 2.4 GHz RF band range. The master controller 24 may optionally be remotely positioned with respect to the battery modules 14, such as at least about 0.1 meters (m) or at least 0.5 m away from the battery modules 14, or may mount directly to a surface of the RESS.

It is to be appreciated that the monitor and control system 22 and the method may be used for one or more onboard systems 12, and for illustrative purposes, the below discussion focuses on one onboard system 12. Furthermore, for illustrative purposes, a vehicle application will be described below.

The assembly 10 may include a battery pack or rechargeable energy storage system (RESS) and an electronic control unit (ECU), referred to hereinafter as the master controller 24. The RESS and the master controller 24 may collectively form a battery system that is one non-limiting example of the onboard system 12. The master controller 24 includes a processor (P) and a memory (M), and the memory (M) may be programmed with computer-executable logic for controlling overall operation of the RESS after integration of the battery pack into the onboard system 12.

It is to be appreciated that the master controller 24 may be optionally embodied as a master battery controller, for instance a Battery System Manager (BSM), and may include one or more computer devices each having one or more of the processors (P) and sufficient amounts of the memory (M), e.g., read only memory, random access memory, and electrically-erasable programmable read only memory. The master controller 24 may include a wireless transceiver 26 configured to request transmission of the signals/data wirelessly from the RESS, e.g., via a data request signal 28 transmitted to the battery module 14, and may also be configured to run/execute various software programs in the overall control of the RESS so as to execute control actions. Example control actions may include cell charge balancing operations in which the states of charge of the various battery cells 18 are equalized, e.g., via internal switching control of the battery module 14, as well as health monitoring, electric range estimation, and/or powertrain 16 control actions when integrated into the vehicle of FIG. 1. Control actions may include recording diagnostic codes and/or taking other real-time control actions when the data is indicative of an impending or actual fault of the battery module 14. As part of such programs, the master controller 24 may receive other signals not described herein.

As described below with reference to FIG. 1, the RESS includes one or more battery modules 14 each including a plurality of battery cells 18 that are rechargeable. The battery cells 18 may be formed of various materials that are rechargeable, e.g., lithium ion or nickel metal hydride battery cells 18 or any other suitable material of battery cells 18. The RESS may be recharged by a charging current supplied from an offboard power supply, and in some configurations, via onboard energy regeneration. The offboard power supply may be a stand-alone unit that is independent or external to the vehicle. The onboard power supply may be internal to the vehicle.

The battery modules 14 are each configured such that cell sensing, battery module-to-battery module, and battery module-to-master controller communication functionality is integrated directly into the battery modules 14 and perform hard-wired or wirelessly via a corresponding cell monitoring unit (CMU). Each of the battery modules 14 may include a corresponding CMU. Generally, each CMU measures and reports battery data inclusive of individual cell voltages, cell temperatures, cell pressures, cell composition such as gas and chemical features, etc. for the corresponding battery cells 18 residing within the respective battery modules 14 to which the CMU is connected.

Generally, the monitor and control system 22 includes a plurality of sensors 30 in communication with the onboard system 12. The sensors 30 may be part of the respective CMU of the respective battery module 14. For example, for the battery application, the sensors 30 may monitor various components, such as individual cell voltages, cell temperatures, cell pressures, cell composition such as gas and chemical features, etc. for the corresponding battery cells 18. Furthermore, the sensors 30 may be grouped such that there is one group of sensors 30 that monitor the cell voltages, a second group of sensors 30 that monitor the cell temperatures, etc., for as many desired features to be monitored via the desired groups of the sensors 30. Additionally, one or more of the groups of sensors 30 may monitor multiple features, and for example, one group of the sensors 30 may monitor the cell voltages and the cell temperatures, and so on, as desired. Generally, the sensors 30 are in wireless communication with each other.

The sensors 30 are configured to monitor the assigned feature(s) and detect whether an event 32 occurred in the onboard system 12. As such, one or more of the sensors 30 detect whether the event 32 occurred in the onboard system 12. The sensors 30 may detect the event 32 regardless of whether the vehicle is on or off. Therefore, the sensors 30 are continuously monitoring the various onboard systems 12. As non-limiting examples, the event 32 may include a thermal event 32, such as thermal runaway, a high temperature, or a low temperature, a voltage event 32, such as a high voltage or a low voltage, a pressure event 32, such as a high pressure or a low pressure, a leakage of material, other off-nominal battery event 32, etc.

However, the master controller 24 is operational independent of whether the vehicle is on or off. In certain situations, the master controller 24 may be completely powered off, thus providing a power savings. For example, the master controller 24 may be completely powered off when the vehicle is off and the battery module 14 is not being charged. In other configurations, the master controller 24 is partially powered off, which also provides a power savings. For example, the master controller 24 may be partially powered off when the vehicle is off and the battery module 14 is being charged. As other examples, the master controller 24 may be partially powered off when the vehicle is off but one or more peripherals or high-frequency clock is running. The amount of power savings (regardless of whether the master controller 24 is completely or partially powered off) may be up to 1000 times as compared to conventional host computers as discussed in the introduction above. In other words, the power savings (regardless of whether the master controller 24 is completely or partially powered off) may be about 90% to about 99% as compared to conventional host computers as discussed in the introduction above.

The master controller 24 includes a nominal mode in which the master controller 24 is powered on and configured to actively monitor the sensors 30 and control the onboard system 12. In general, the nominal mode enables real-time monitoring and streaming of the sensor 30 information, which may be via a RF to the master controller 24 when the assembly 10 is being operated. For example, the master controller 24, in the nominal mode, may monitor the information from the sensors 30 and determine whether one or more of the onboard systems 12 should perform a task or operation.

The master controller 24 also includes a sleep mode in which the master controller 24 is powered off and the master controller 24 does not monitor the sensors 30 and does not control the onboard system 12 when in the sleep mode. The master controller 24 is in the sleep mode when the vehicle is powered off and the battery module 14 is not being charged. When the vehicle is shut off and the battery modules 14 are not being charged, the master controller 24 is triggered to enter the sleep mode, in which no power is supplied to the master controller 24, and therefore, the master controller 24 does not receive any information from the sensors 30. As such, when the master controller 24 is in the sleep mode, the master controller 24 may be completely powered off, which again provides a power savings. In addition, having the master controller 24 completely powered off when in the sleep mode also reduces network traffic and coordination needs. The master controller 24 may be automatically triggered to switch to the sleep mode by any suitable queue, and for example, after a predetermined amount of time has passed with the vehicle off and no charging of the battery modules 14.

The monitor and control system 22 also includes an agent controller 34 in communication with the sensors 30 and the master controller 24. Generally, the agent controller 34 takes instructions from the master controller 24 when the master controller 24 is in the nominal mode, and therefore, the agent controller 34 may be referred to as a slave controller. When the master controller 24 is going to the sleep mode, the master controller 24 communicates that information to the agent controller 34. The agent controller 34 also includes a processor (P) and a memory (M), and the memory (M) may be programmed with computer-executable logic for monitoring the sensors 30 and determining whether to wake the master controller 24 from the sleep mode. Generally, the agent controller 34 is configured to monitor the sensors 30 when the master controller 24 is in the sleep mode. The sensors 30 may continuously arbitrate between each other to monitor the onboard system 12 while the master controller 24 is in the sleep mode. The agent controller 34 may be part of the respective CMU of the respective battery module 14.

Once the event 32 is signaled to the agent controller 34, the agent controller 34 determines whether to awaken the master controller 24. Therefore, the agent controller 34 is also configured to awaken the master controller 24 from the sleep mode in response to one or more of the sensors 30 signaling the agent controller 34 of the event 32. The master controller 24 may be woken-up via the agent controller 34 when certain conditions are met. For example, the master controller 24 may be woken-up by a voltage wake-up arbitration 36 or a transceiver wake-up arbitration 38, which will be discussed further below.

Generally, the sensors 30 communicate with the master controller 24 when the master controller 24 is in the nominal mode in which the master controller 24 is powered on to actively monitor the sensors 30. More specifically, the sensors 30 communicate with the master controller 24 through the agent controller 34. Therefore, in the nominal mode, the sensors 30 may communicate with the agent controller 34 and then the agent controller 34 passes the information to the master controller 24 such that the sensors 30 indirectly communicate with the master controller 24. When the master controller 24 is in the sleep mode, the master controller 24 is powered off and does not monitor the sensors 30 when in the sleep mode, and thus, the sensors 30 communicate with the agent controller 34 while bypassing the master controller 24. As such, the agent controller 34 monitors the sensors 30 when the master controller 24 is in the sleep mode. Therefore, generally, the onboard system 12 is continuously monitored via the sensors 30 while the master controller 24 is in the sleep mode. More specifically, the sensors 30 continuously arbitrate between each other to monitor the onboard system 12 while the master controller 24 is in the sleep mode. As such, the sensors 30 provide continuous monitoring and diagnostic features to the onboard system 12 regardless of the mode of the master controller 24.

The sensors 30 continuously monitor the assigned component(s) regardless of whether the master controller 24 is in the nominal mode or the sleep mode. However, while the master controller 24 is in the sleep mode, the sensors 30 and the agent controller 34 are powered via the battery module 14. The master controller 24 generally requires more power to operate than the sensors 30 and the agent controller 34, and therefore, power consumption may be lowered using the method and the monitor and control system 22 described herein. As such, the sensors 30 and the agent controller 34 may operate in a low power mode when the master controller 24 is in the sleep mode to reduce power consumption while the vehicle is off. For example, the sensors 30 and the agent controller 34 may be operated on a voltage of greater than zero volts and less than six volts via the battery module 14 while the master controller 24 is in the sleep mode. More specifically, the agent controller 34 may operate on a voltage of between about 3.3 volts and about 5 volts when the master controller 24 is in the sleep mode. In one configuration, the agent controller 34 may operate on a voltage of about 3.3 volts when the master controller 24 is in the sleep mode. Therefore, the low power mode may be when power consumption is greater than zero volts and less than six volts.

If no event 32 is detected via the sensors 30 while the master controller 24 is in the sleep mode, the sensors 30 continue to monitor and diagnose the assigned component(s). If an event 32 is detected via one or more of the sensors 30 while the master controller 24 is in the sleep mode, then generally, one or more of the sensors 30 signals the agent controller 34 when the master controller 24 is in the sleep mode that the event 32 has occurred in the onboard system 12. For example, for the battery application, the one or more of the sensors 30 may detect the event 32 occurred in one of the battery cells 18 of the battery module 14.

In certain configurations, before the sensors 30 communicate with the agent controller 34 of the event 32, the sensors 30 may cross-check with each other, and thus, may self-diagnose before communicating information to the agent controller 34. For example, the sensors 30 may arbitrate between each other to determine whether at least one other sensor 30 detects the same event 32. Therefore, another one of the sensors 30 may be signaled to confirm that the event 32 occurred in the onboard system 12. If both of the sensors 30 detect the same event 32, then the agent controller 34 is signaled of the event 32. More specifically, the one or more of the sensors 30 that originally detected the event 32 may be defined as a first sensor 30 (for example, in group 1), and the sensor 30 that is signaled to confirm the event 32 may be defined as a second sensor 30 (for example, in group N), and therefore, the data compiled from the first sensor 30 and the data compiled from the second sensor 30 are compared. As such, the agent controller 34 is signaled that the event 32 has occurred when the compared data from the first and second sensors 30 are the same.

If the sensors 30 detect different events 32 or different data regarding the onboard system 12, this data is communicated to the agent controller 34 and the agent controller 34 may compile additional data and/or determine whether to wake the master controller 24 based on the collected different events 32 or different data. As such, the agent controller 34 is signaled that the compared data from the first and second sensors 30 are different. Next, the agent controller 34 may compile data from one or more of the sensors 30 other than the first and second sensors 30 when the compared data from the first and second sensors 30 are different.

The agent controller 34 analyzes the data received regarding the event 32, and determines whether to awaken the master controller 24. The agent controller 34 signals the master controller 24 to awaken from the sleep mode in response to the one or more of the sensors 30 signaling the agent controller 34 of the event 32. In certain configurations, the agent controller 34 signals the master controller 24 to awaken from the sleep mode when the agent controller 34 compiled data from the one or more of the sensors 30 other than the first and second sensors 30 to confirm that the event 32 occurred. Furthermore, the agent controller 34 may signal the master controller 24 to awaken from the sleep mode even when the data compiled is different between the sensors 30.

Once the agent controller 34 determines that the event 32 requires waking up the master controller 24, the master controller 24 may be woken-up by the voltage wake-up arbitration 36 or the transceiver wake-up arbitration 38 as discussed above. With regard to the voltage wake-up arbitration 36, in certain configurations, a predetermined voltage draw outside of the low power mode may cause the master controller 24 to switch from the sleep mode to the nominal mode. With regard to the voltage wake-up arbitration 36, in other configurations, a voltage pattern or a predetermined amount of time that the voltage is applied may cause the master controller 24 to switch from the sleep mode to the nominal mode. The master controller 24 and the agent controller 34 may each include a comparator 40, and the comparator 40 of the master controller 24 measures the voltage or current, and depending on the voltage/current, time, or the pattern, determines that the master controller 24 is to awaken.

With regard to the transceiver wake-up arbitration 38, before the master controller 24 switches to the sleep mode, the master controller 24 switches the status of the transceiver 26 to an agent mode. When the master controller 24 is in the agent mode, the agent controller 34 has permission to wake the master controller 24 as desired. On awaken, the transceiver 26 of the master controller 24 resets from the agent mode, and the master controller 24 returns to the nominal mode. In addition, the voltage to the agent controller 34 may be pulsed between from about 5.0 volts to about 3.3 volts which may prevent reset out of the agent mode but may be routed to the comparator 40 of the agent controller 34 and the agent controller 34 may determine whether the master controller 24 should be switched back to the nominal mode. A regulator may step the about 5.0 volts down to approximately 3.3 volts for the agent controller 34. By stepping down the voltage for the agent controller 34, there is no need to reform the network since the power is not being completely shut off to the agent controller 34. Optionally, both of the master controller 24 and the agent controller 34 may include a transceiver 26 to maintain hardware encoded requirement via resistors. In addition, an alternating current (AC) communication signal may be used over the volt line as a control stream between the master controller 24 and the agent controller 34.

The master controller 24 switches to the nominal mode when woken-up from the sleep mode. Generally, the master controller 24 uses power greater than the low power mode. For example, a voltage of between about 10 volts and about 15 volts is supplied to the master controller 24 to operate in the nominal mode while the vehicle remains off. In certain configurations, the master controller 24 may operate on a voltage of about 12 volts when returning to the nominal mode while the vehicle is off. The master controller 24 returns to the nominal mode in response to being woken-up, and is configured to determine the operation to perform to the assembly 10 in response to the event 32. Therefore, the event 32 is communicated to the master controller 24, and the master controller 24 determines the operation to perform to the assembly 10 in response to the event 32. Non-limiting examples of the various operations that the master controller 24 may have the assembly 10 perform may include activating an indicator, a pump, a fan, etc., deactivating a pump, a fan, etc., switching a component on or off, etc.

In certain configurations, the master controller 24 may include the transceiver 26. The agent controller 34 may be in communication with the transceiver 26 to awaken the master controller 24 from the sleep mode to the nominal mode. Generally, the master controller 24 and the agent controller 34 may be hard-wired or in wireless communication with each other. Therefore, in certain configurations, the transceiver 26 of the master controller 24 and the agent controller 34 may be in wireless communication with each other.

Figure 3:
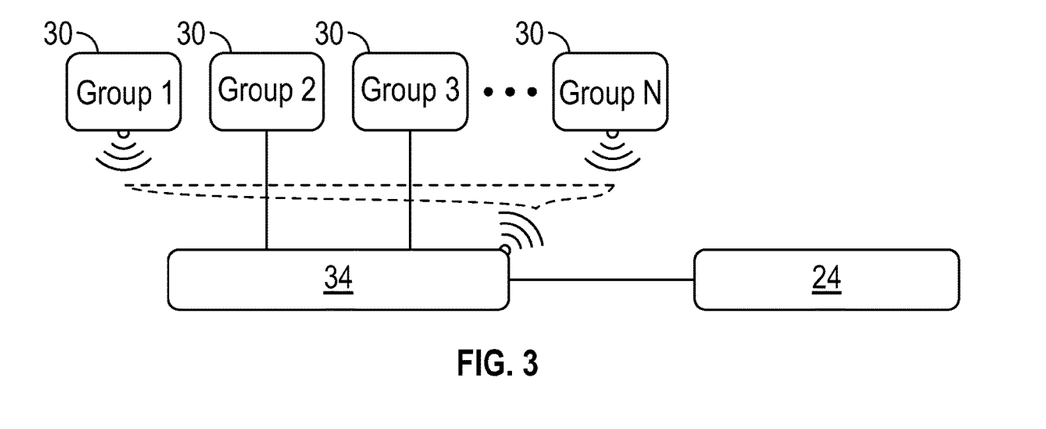
FIG. 3 is a schematic illustration of the master controller actively controlling/monitoring the sensors and the agent controller, with the master controller in a nominal mode.

An example of the operation of the monitor and control system 22 will be discussed with reference to FIGS. 3-7. Starting with FIG. 3, when the vehicle is powered on, the master controller 24 is in the nominal mode and controls/monitors the various onboard systems 12, as well as controls the agent controller 34. As also illustrated in FIG. 3, the sensors 30 may communicate with each other and with the agent controller 34. The sensors 30 communicate with each other wirelessly, and the agent controller 34 may communicate with the sensors 30 either wirelessly or by being hard-wired.

Figure 4:
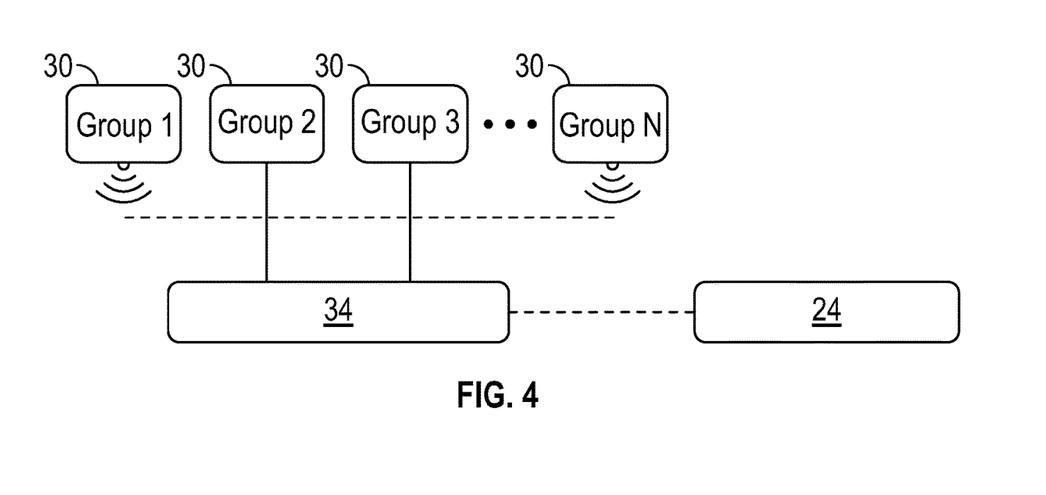
FIG. 4 is a schematic illustration of the sensors monitoring the various components of the onboard system while the master controller is in a sleep mode.

Turning to FIG. 4, the vehicle is powered off, and the master controller 24 switches from the nominal mode to the sleep mode. Continuing with FIG. 4, power is delivered to the sensors 30 and the agent controller 34 to monitor the onboard systems 12 while the master controller 24 is in the sleep mode. The sensors 30 continue to communicate with various components of the onboard system 12.

Figure 5:
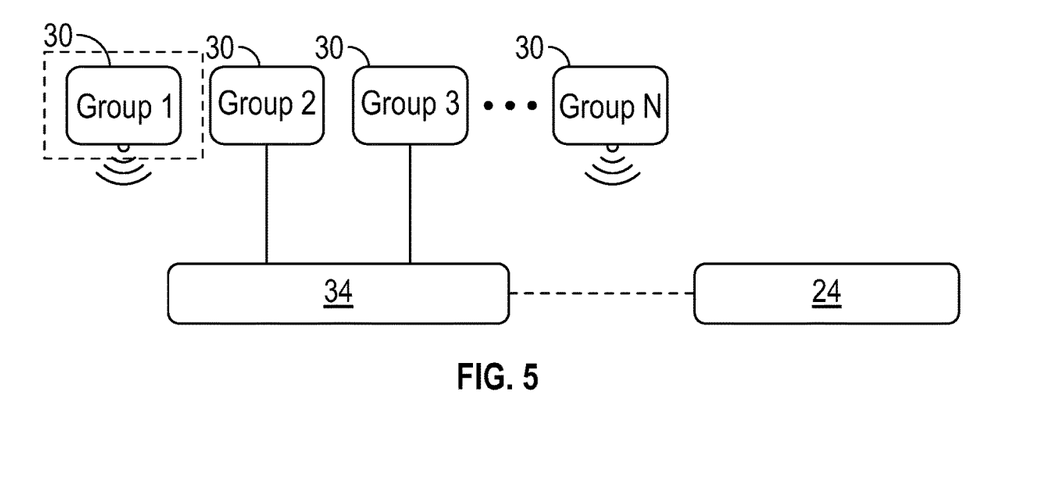
FIG. 5 is a schematic illustration of one of the sensors in group 1 detecting an event, with the master controller in the sleep mode.
Figure 6:
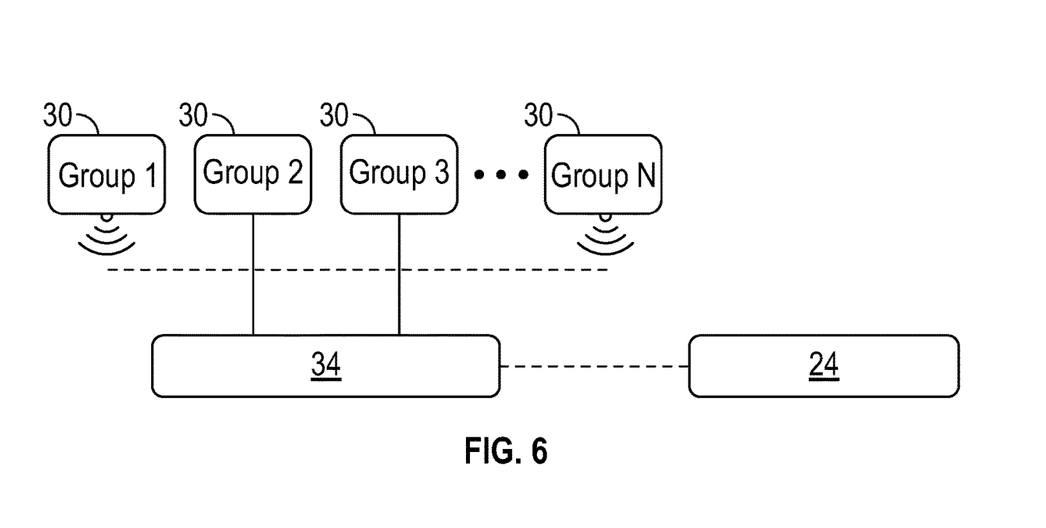
FIG. 6 is a schematic illustration of the sensor in group 1 communicating with another sensor in group N, with the master controller in the sleep mode.

Referring to FIGS. 5 and 6, the master controller 24 is still in the sleep mode. Now, in FIG. 5, an event 32 has been detected via one of the sensors 30 in group 1. The sensor 30 that detected the event 32 may compare other sensor 30 readings within the group 1 or in another group. Referring to FIG. 6, the sensor 30 that detected the event 32 in group 1 communicates with another one of the sensors 30 in a different group (group N in this example) to determine if the sensor 30 from group N detects the same event 32. At this point, the agent controller 34 has not been notified of the event 32 yet.

Turning to FIG. 6, the data compiled from the sensors 30 regarding the event 32 is communicated to the agent controller 34. The event 32 may be communicated to the agent controller 34 when the same event 32 is confirmed between different sensors 30 or when the sensors 30 do not compile the same data. If the sensors 30 do not compile the same data, the agent controller 34 may communicate with other sensors 30, and determine whether the master controller 24 should be woken-up.

Figure 7:
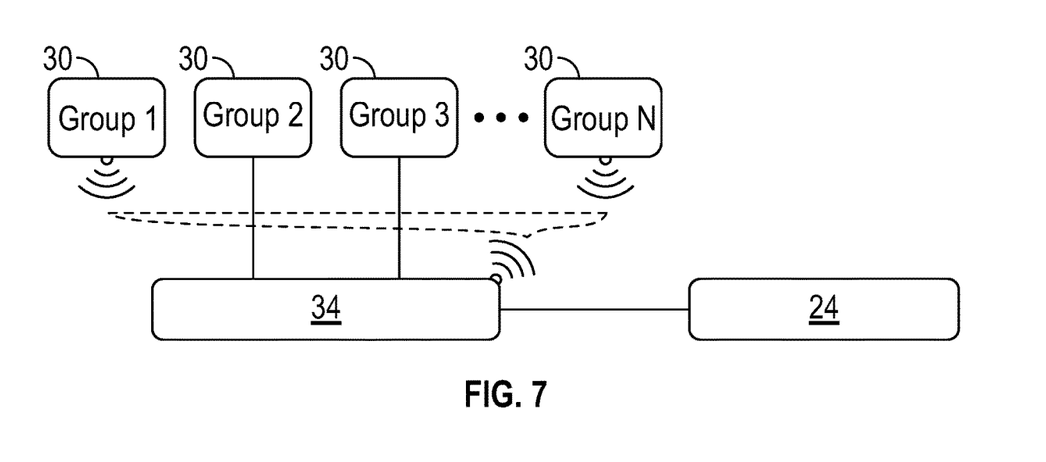
FIG. 7 is a schematic illustration of the sensors communicating with the agent controller, and the agent controller wakes-up the master controller.

Referring to FIG. 7, the agent controller 34 determines that the event 32 requires waking up the master controller 24. Here, the agent controller 34 communicates to the master controller 24 to switch from the sleep mode to the nominal mode. The agent controller 34 wakes the master controller 24 up by either the voltage wake-up arbitration 36 or the transceiver wake-up arbitration 38. Once the master controller 24 returns to the nominal mode, the master controller 24 determines what operation to perform on the assembly 10.

It is to be appreciated that the order or sequence of performing the method is for illustrative purposes and other orders or sequences are within the scope of the present teachings.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of monitoring and controlling an onboard system of an assembly; the method comprising:
   detecting via one or more of a plurality of sensors whether an event occurred in the onboard system;
   communicating with the sensors via a master controller when the master controller is in a nominal mode in which the master controller is powered on to actively monitor the sensors, and the master controller includes a sleep mode in which the master controller is powered off and does not monitor the sensors when in the sleep mode;
   monitoring the sensors, via an agent controller, when the master controller is in the sleep mode;
   signaling, via one or more of the sensors, the agent controller when the master controller is in the sleep mode that the event has occurred in the onboard system;
   signaling, via the agent controller, the master controller to awaken from the sleep mode in response to the one or more of the sensors signaling the agent controller of the event;
   switching the master controller to the nominal mode when woken-up from the sleep mode;
   communicating the event to the master controller and determining, via the master controller, an operation to perform to the assembly in response to the event;
   continuously monitoring the onboard system via the sensors while the master controller is in the sleep mode;
   wherein continuously monitoring the onboard system further comprises continuously arbitrating between the sensors to monitor the onboard system;
   wherein the assembly is further defined as a vehicle;
   wherein the onboard system is further defined as a battery module that includes a plurality of battery cells that are rechargeable;
   wherein the battery module is configured to provide power to the vehicle when the vehicle is powered on;
   wherein the master controller is in the sleep mode when the vehicle is powered off and the battery module is not charging; and
   operating the sensors and the agent controller on a voltage of greater than zero volts and less than six volts via the battery module while the master controller is in the sleep mode.

2. The method as set forth in claim 1 further comprising signaling another one of the sensors to confirm that the event occurred in the onboard system.

3. The method as set forth in claim 2 wherein the one or more of the sensors that originally detected the event is defined as a first sensor, and the sensor that is signaled to confirm the event is defined as a second sensor, and further comprising comparing data compiled from the first sensor and data compiled from the second sensor.

4. The method as set forth in claim 3 wherein signaling, via the one or more of the sensors, the agent controller when the master controller is in the sleep mode further comprises signaling the agent controller that the event has occurred when the compared data from the first and second sensors are the same.

5. The method as set forth in claim 4 wherein signaling, via the one or more of the sensors, the agent controller when the master controller is in the sleep mode further comprises signaling the agent controller that the compared data from the first and second sensors are different.

6. The method as set forth in claim 5 further comprising compiling data, via the agent controller, from one or more of the sensors other than the first and second sensors when the compared data from the first and second sensors are different.

7. The method as set forth in claim 6 wherein signaling, via the agent controller, the master controller to awaken from the sleep mode further comprises signaling, via the agent controller, the master controller to awaken from the sleep mode when the agent controller compiled data from the one or more of the sensors other than the first and second sensors to confirm that the event occurred.

8. The method as set forth in claim 1 wherein detecting via one or more of the sensors whether the event has occurred in the onboard system further comprises detecting via the one or more of the sensors whether the event occurred in one of the battery cells of the battery module.

9. The method as set forth in claim 1 wherein signaling, via the agent controller, the master controller to awaken from the sleep mode further comprises using a voltage wake-up arbitration or a transceiver wake-up arbitration to switch the master controller back to the nominal mode.

10. The method as set forth in claim 1 further comprising analyzing, via the agent controller, data received regarding the event, and determining, via the agent controller, whether to awaken the master controller.

11. A method of monitoring and controlling an onboard system of an assembly; the method comprising:

detecting via one or more of a plurality of sensors whether an event occurred in the onboard system;

communicating with the sensors via a master controller when the master controller is in a nominal mode in which the master controller is powered on to actively monitor the sensors, and the master controller includes a sleep mode in which the master controller is powered off and does not monitor the sensors when in the sleep mode;

monitoring the sensors, via an agent controller, when the master controller is in the sleep mode;

signaling, via one or more of the sensors, the agent controller when the master controller is in the sleep mode that the event has occurred in the onboard system;

signaling, via the agent controller, the master controller to awaken from the sleep mode in response to the one or more of the sensors signaling the agent controller of the event;

switching the master controller to the nominal mode when woken-up from the sleep mode;

communicating the event to the master controller and determining, via the master controller, an operation to perform to the assembly in response to the event;

signaling another one of the sensors to confirm that the event occurred in the onboard system;

wherein the one or more of the sensors that originally detected the event is defined as a first sensor, and the sensor that is signaled to confirm the event is defined as a second sensor;

comparing data compiled from the first sensor and data compiled from the second sensor;

wherein signaling, via the one or more of the sensors, the agent controller when the master controller is in the sleep mode further comprises signaling the agent controller that the event has occurred when the compared data from the first and second sensors are the same;

wherein signaling, via the one or more of the sensors, the agent controller when the master controller is in the sleep mode further comprises signaling the agent controller that the compared data from the first and second sensors are different; and compiling data, via the agent controller, from one or more of the sensors other than the first and second sensors when the compared data from the first and second sensors are different.

12. A monitor and control system for an onboard system of an assembly, the monitor and control system comprising:

a plurality of sensors in communication with the onboard system and configured to detect whether an event occurred in the onboard system;

a master controller including a processor and a memory, and the master controller includes a nominal mode in which the master controller is powered on and configured to actively monitor the sensors and control the onboard system, and a sleep mode in which the master controller is powered off and the master controller does not monitor the sensors and does not control the onboard system when in the sleep mode;

an agent controller including a processor and a memory, and the agent controller is in communication with the sensors and the master controller;

wherein the agent controller is configured to monitor the sensors when the master controller is in the sleep mode, and the agent controller is configured to awaken the master controller from the sleep mode in response to one or more of the sensors signaling the agent controller of the event;

wherein the master controller returns to the nominal mode in response to being woken-up, and is configured to determine an operation to perform to the assembly in response to the event;

wherein the assembly is further defined as a vehicle;

wherein the onboard system is further defined as a battery module that includes a plurality of battery cells that are rechargeable;

wherein the battery module is configured to provide power to the vehicle when the vehicle is powered on;

wherein the master controller is in the sleep mode when the vehicle is powered off and the battery module is not charging; and wherein the sensors and the agent controller operate on a voltage of greater than zero volts and less than six volts via the battery module while the master controller is in the sleep mode.

13. The monitor and control system as set forth in claim 12 wherein the master controller includes a transceiver, and wherein the agent controller is in communication with the transceiver to awaken the master controller from the sleep mode to the nominal mode.

14. The monitor and control system as set forth in claim 13 wherein the transceiver of the master controller and the agent controller are in wireless communication with each other.

15. The monitor and control system as set forth in claim 12 wherein the sensors are in wireless communication with each other such that the sensors continuously arbitrate between each other to monitor the onboard system while the master controller is in the sleep mode.

16. The method as set forth in claim 11 wherein detecting via one or more of the sensors whether the event has occurred in the onboard system further comprises detecting via the one or more of the sensors whether the event occurred in one of a plurality of battery cells of a battery module.

17. The method as set forth in claim 11 wherein signaling, via the agent controller, the master controller to awaken from the sleep mode further comprises using a voltage wake-up arbitration or a transceiver wake-up arbitration to switch the master controller back to the nominal mode.

18. The method as set forth in claim 16 further comprising continuously monitoring the onboard system via the sensors while the master controller is in the sleep mode.

19. The method as set forth in claim 18:

wherein the assembly is further defined as a vehicle;

wherein the onboard system is further defined as a battery module that includes a plurality of battery cells that are rechargeable;

wherein the battery module is configured to provide power to the vehicle when the vehicle is powered on;

wherein the master controller is in the sleep mode when the vehicle is powered off and the battery module is not charging; and further comprising operating the sensors and the agent controller on a voltage of greater than zero volts and less than six volts via the battery module while the master controller is in the sleep mode.

20. The method as set forth in claim 19 wherein detecting via one or more of the sensors whether the event has occurred in the onboard system further comprises detecting via the one or more of the sensors whether the event occurred in one of the battery cells of the battery module.

* * * * *